United States Patent [19]

Saito

[11] 4,422,084

[45] Dec. 20, 1983

[54] FLUID TANK AND DEVICE FOR DETECTING REMAINING FLUID

[75] Inventor: Shizuo Saito, Shiojiri, Japan

[73] Assignees: Epson Corporation, Nagano; Kabushiki Kaisha Suwa Seikosha, Tokyo, both of Japan

[21] Appl. No.: 204,115

[22] Filed: Nov. 5, 1980

[30] Foreign Application Priority Data

Nov. 6, 1979 [JP] Japan ............................... 54-143708
Nov. 22, 1979 [JP] Japan ............................... 54-151824

[51] Int. Cl.[3] ............................................ G01D 18/00

[52] U.S. Cl. ................................ 346/140 R; 101/364; 116/227; 73/313

[58] Field of Search .............. 346/75, 140 R, 140 PD; 73/293, 304 R, 305, 313, 290 R; 101/364, 366; 116/227; 239/71–74

[56] References Cited

U.S. PATENT DOCUMENTS 3,908,441 9/1975 Virloget ............................ 73/293 X
4,202,267 5/1980 Heinzl et al. ............... 346/140 R X

OTHER PUBLICATIONS

*IBM Technical Disclosure Bulletin,* vol. 16, No. 3, Aug. 1973 pp. 796–797, Findlay, "Jet Printer Ink Supply System".

*Primary Examiner*—A. D. Pellinen
*Assistant Examiner*—W. J. Brady
*Attorney, Agent, or Firm*—Blum Kaplan

[57] ABSTRACT

A vessel for storing fluid and a device for detecting remaining fluid in the vessel is provided. The vessel is maintained at a pressure less than atmospheric, but in a range not sufficient to overcome the surface tension of fluid remaining in a nozzle. This prevents fluid from escaping out from the nozzle when the tank is maintained at a height equal to or higher than the nozzle orifice. The tank may be formed from an elastic material or may include a biasing member for maintaining the negative pressure. An ink jet printer including an ink tank maintained at a pressure less than atmospheric main include a device for detecting ink remaining in the tank. Opposing walls of the tank may be conductive and upon consumption of ink therein collapse causing a circuit to short for indicating lack of ink in the tank. Alternatively, the device for detecting the remaining ink may include a conductive member mounted on the periphery of the tank which is displaced as the tank collapses. Further, a photosensitive device may be disposed above and below an ink tank formed of a transparent material which indicates lack of ink remaining when light penetrates the ink tank. In another embodiment a second ink chamber is formed inside the ink tank for providing a signal by means of a different color ink which is printed upon consumption of the ink from the main ink tank.

26 Claims, 33 Drawing Figures

FIG. 3
PRIOR ART
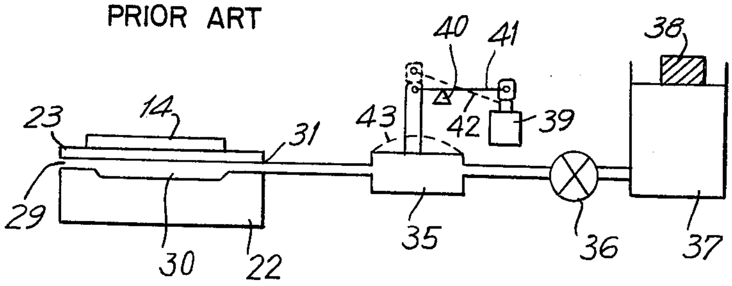
FIG. 4
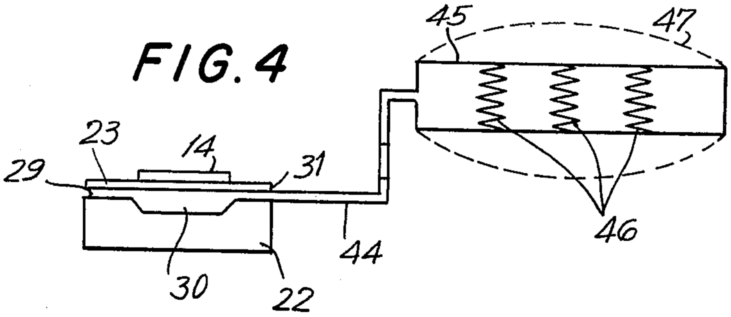
FIG. 5a
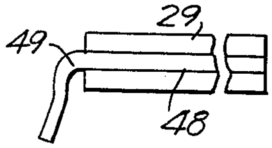
FIG. 5b
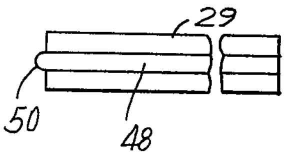
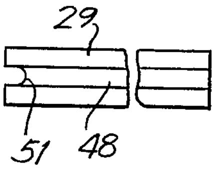
FIG. 5c FIG. 14
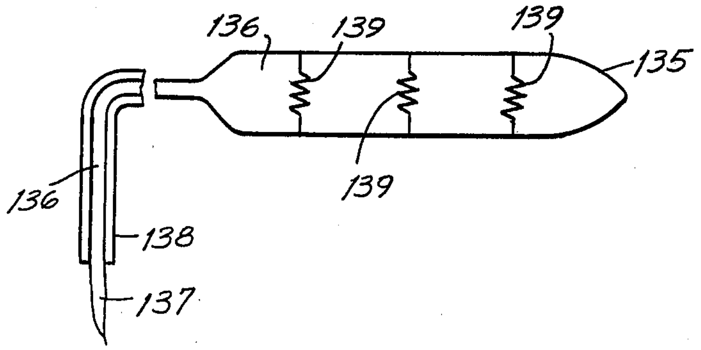
FIG. 15a
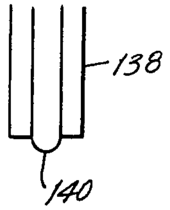
FIG. 15c
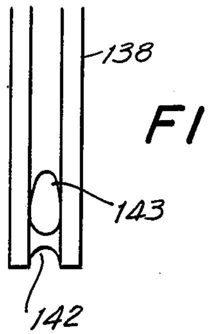
FIG. 15b
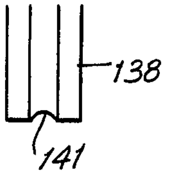
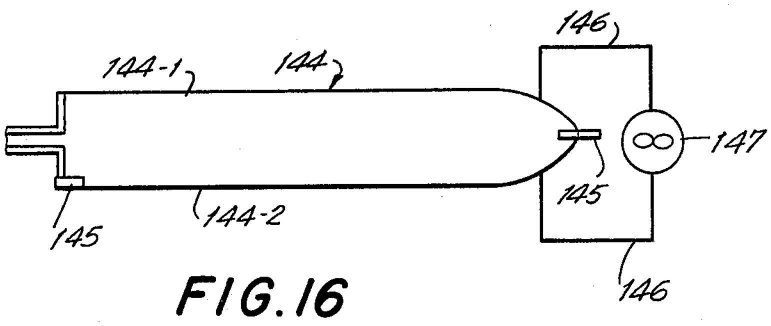
FIG. 16
FIG. 17
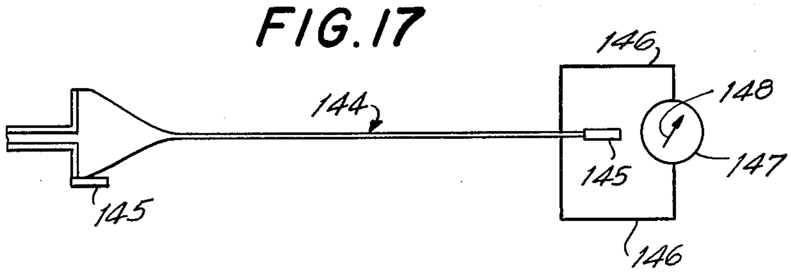

FIG. 25
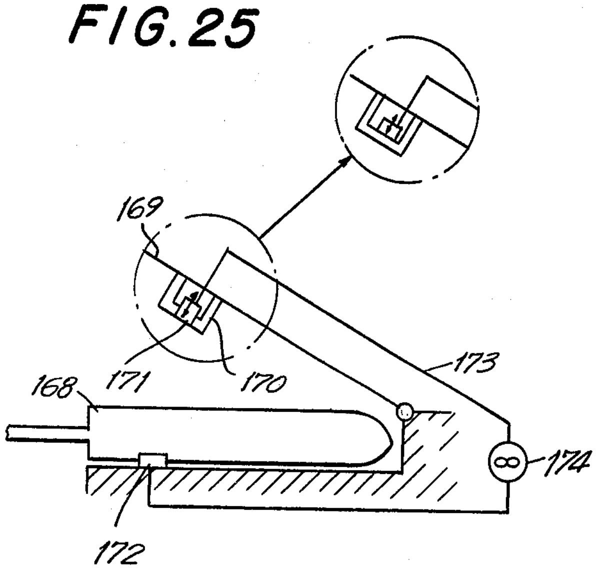
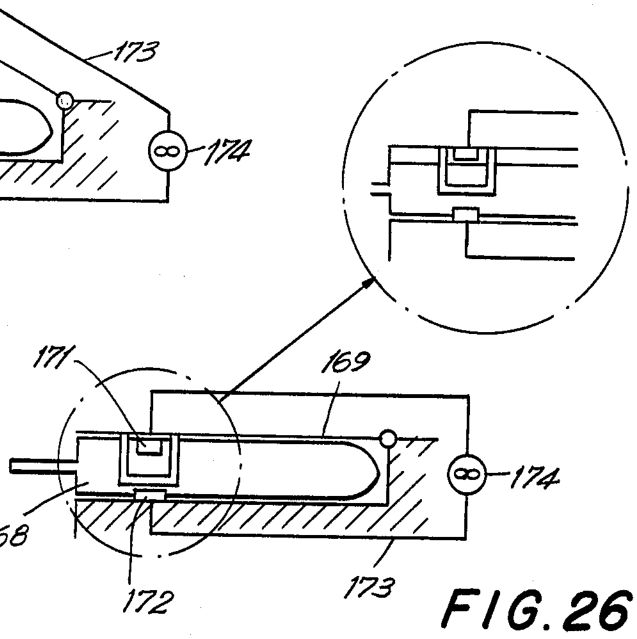
FIG. 26
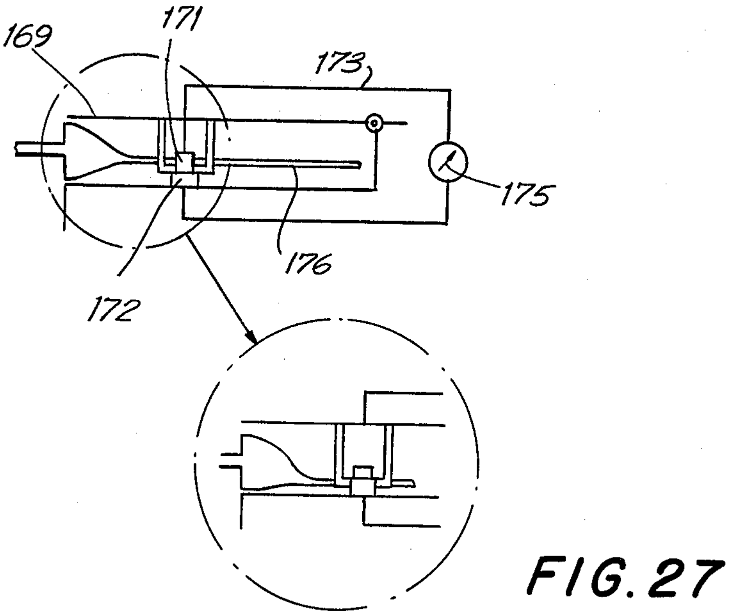
FIG. 27

FLUID TANK AND DEVICE FOR DETECTING REMAINING FLUID

BACKGROUND OF THE INVENTION

This invention relates to an ink tank and a device for detecting ink remaining in the tank for an ink jet print head, and more particularly to an ink tank which is maintained at a pressure less than atmospheric and an ink jet print head including a device for detecting ink remaining in the ink tank.

Ink jet printers which print various characters patterns by discharging ink from a nozzle have recently become more popular. This recent popularity is due to the following advantages: noise is not produced as there is no impact on printing; printing may be on any type of print paper; printing contrast is high; energy required for printing is low; printing speed is high; a light weight and compact printer may be easily made; and so on. However, even though it is well known how to make a lightweight and compact jet printer, it has not been possible to apply this to a portable or pocket printing apparatus which may be freely carried about, since the printer ink escapes from the printer. It is also not possible for the conventional ink jet printer to print in all orientations of the printer. Additionally, the ink jet printer has a serious disadvantage due to the intrusion of bubbles into the ink tank. Accordingly, it would be desirable to provide an ink jet printer which may be freely carried about and can be printed in any print orientation. Additionally, it would be desirable to provide a means to prevent bubbles from intruding into the nozzle cavity and overcome the disadvantages of conventional ink jet printers.

SUMMARY OF THE INVENTION

Generally speaking, in accordance with the invention, an ink tank for use in an ink jet print head wherein character patterns are printed by discharging ink drops from a nozzle orifice in the print head is provided. The ink tank is a source for storing and supplying ink to the nozzle and is maintained at a pressure less than atmospheric pressure. The ink is maintained at a pressure which is less than the surface tension of the ink remaining in the nozzle, but not low enough to permit bubbles to intrude into the tank. The pressure is within the range so that ink does not escape out from the nozzle when the ink tank is disposed at a height equal to or higher than the nozzle. In order to accomplish this, the ink tank is fabricated from an elastic material which collapses upon ink being supplied to the nozzle. The elastic material may be an organic polymeric material, such as polypropylene. In a preferred embodiment of the invention, the ink tank is flat with a unitarily formed supply port.

The ink tank in accordance with the invention may include an element for detecting ink remainig in the tank. In accordance with this aspect of the invention, opposed sides of a flat ink tank are formed of a conductive material and separated by an insulating member. Lead wires are connected to the opposed surfaces and both surfaces which come into contact with each other upon exhaustion of the ink supply an electrical short is caused. In a further embodiment of the invention a secondary chamber containing ink of a second color is formed inside the main ink chamber which is discharged only when the printing ink in the main chamber is exhausted. Additional devices for detecting remaining ink include a photosensitive device with detecting elements disposed on the upper end lower side of a transparent tank which permits light to pass through upon exhaustion of the ink. Additionally, the device may include a conductive member disposed on the upper surface of the tank which is displaced toward a second conductive member for completing an electrical circuit as the ink tank collapses.

Accordingly, it is an object of the invention to provide an improved ink jet printing device.

Another object of the invention is to provide an improved ink tank for an ink jet print head.

A further object of the invention is to provide an improved ink jet print head including an ink tank wherein the ink supply is maintained at a pressure less than atmospheric pressure.

Still another object of the invention is to provide an improved ink tank for an ink jet print head which is formed of an elastic material for maintaining the ink supply at a pressure less than atmospheric pressure.

Still a further object of the invention is to provide a device for detecting the quantity of ink remaining in an ink tank.

Yet another object of the invention is to provide a device for detecting the quantity of ink remaining in a transparent ink tank by a photosensitive member.

Yet a further object of the invention is to provide an ink tank having opposed electrically conductive surfaces separated by an insulating member which shorts an electrical circuit upon the supply of ink being exhausted.

Another object of the invention is to provide an ink tank including a secondary ink tank within the main ink tank for warning of exhaustion of ink in the main ink tank.

Still an other object of the invention is to provide an improved device for detecting the quantity of ink remaining in an ink tank wherein the conductive member disposed on the ink tank is displaced toward a second conductive member for completing an electrical circuit upon collapse of the tank upon emptying.

Still other objects and advantages of the invention will in part be obvious and will in part be apparent from the specification.

The invention accordingly comprises the several steps and the relation of one or more of such steps with respect to each of the others, and the apparatus embodying features of construction, combination of elements and arrangement of parts which are adapted to effect such steps, all as exemplified in the following detailed disclosure, and the scope of the invention will be indicated in the claims.

BRIEF DESCRIPTION OF THE DRAWINGS

For a fuller understanding of the invention, reference is had to the following description taken in connection with the accompanying drawings in which:

FIG. 3 is a schematic illustration of a further conventional ink jet printing device;

FIG. 4 is a schematic illustration of an ink jet printing device constructed and arranged in accordance with an embodiment of the invention;

FIG. 5*a*, FIG. 5*b* and FIG. 5*c* illustrates the condition of ink at the nozzle orifice in the printing device of FIG. 4;

FIG. 14 is a schematic illustration of a negative pressure ink tank;

FIG. 15*a*, FIG. 15*b* and FIG. 15*c* illustrate the condition of the ink at the orifice of the nozzle in the printer of FIG. 14;

FIG. 16 is a detecting device including an ink tank having sides formed of a conductive material;

FIG. 17 is a view of the ink tank of FIG. 16 after the ink has been exhausted;

FIG. 25 is a sectional view of the device of FIG. 24;

FIG. 26 is a sectional view of the device of FIG. 24 with the cover in a closed position and the ink tank full; and FIG. 27 is a view of the device of FIGS. 24–26 after the ink has been exhausted from the ink tank.

DESCRIPTION OF THE PREFERRED EMBODIMENTS

Figure 1:
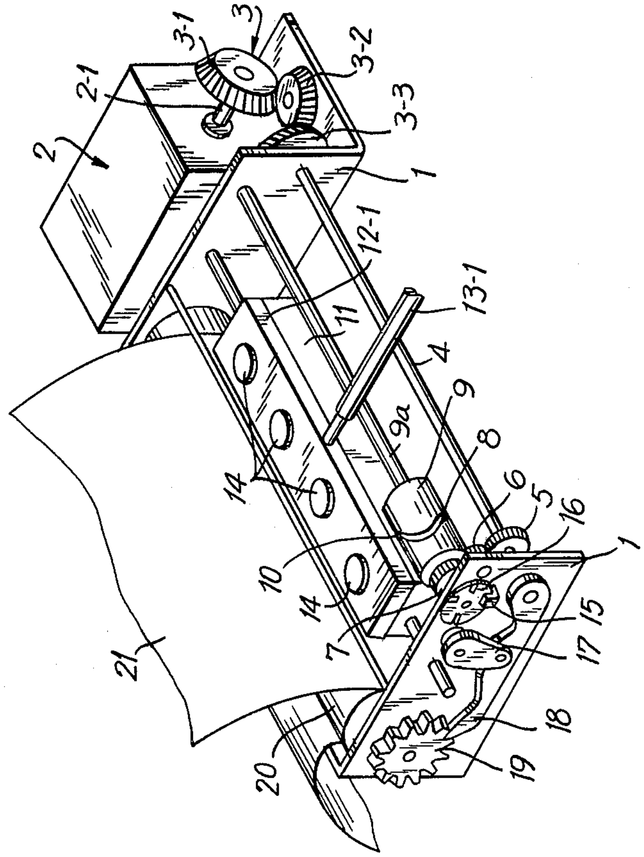
FIG. 1 PRIOR ART
FIG. 1 is a perspective view of a conventional ink jet printing device.

Referring now to FIG. 1, a conventional ink jet printing device is shown. The printing device includes a motor 2 mounted to a first side of a box frame 1. When motor 2 is energized, a motor output shaft 2-1 is rotated and the speed of rotation is reduced by a gear train 3 which includes a first motor gear 3-1, a second frame gear 3-2 and a third coupling gear 3-3 which is mounted on a coupling shaft 4. The reduced speed of rotation is transmitted through coupling shaft 4 to a first link 18 which is pivotably mounted on an opposed wall of box frame 1. Rotation of first link 18 is controlled by a second link 17 also pivotably mounted to frame 1. First link 18 pivots in order to rotate a paper feed wheel 19 commonly mounted to a shaft with a paper feed roller 20 for rotation thereof in order to feed a print paper 21.

At the same time print paper 21 is being advanced, a gear 5 mounted on coupling shaft 4 and rotated thereby. Gear 5 is engaged with an intermediary gear 6 mounted on frame 1 for driving a print gear 7 mounted on a cam shaft 9*a* for rotation thereof. By rotating cam shaft 9*a*, a cylindrical cam 9 also mounted on cam shaft 9*a* is rotated. Cam 9 is formed with a radial groove 8 for receiving a cam guide pin 10 which is mounted on a head support member 11. A cam 9 rotates, head support member 11 is displaced from side to side together with an ink jet head 12-1 mounted on head support member 11. The gear ratio of paper feed gear 19 is regulated so as to feed print paper 21 by one dot pitch after each reciprocating displacement of ink jet head 12-1.

A detection plate 16 formed with slits is also mounted on cam shaft 9*a* on the outer side of frame 1. A photodetector 15 is mounted on frame 1 for cooperation with detection plate 16 for detecting a printing signal. A series of piezoelectric elements 14 of ink jet head 12-1 are deflected in response to the print signals. This displacement of piezoelectric elements 14 causes ink in an ink supply line 13-1 to be discharged selectively from nozzles to print patterns for forming characters on print paper 21. This printing occurs in the manner which will be described in detail.

Figure 2:
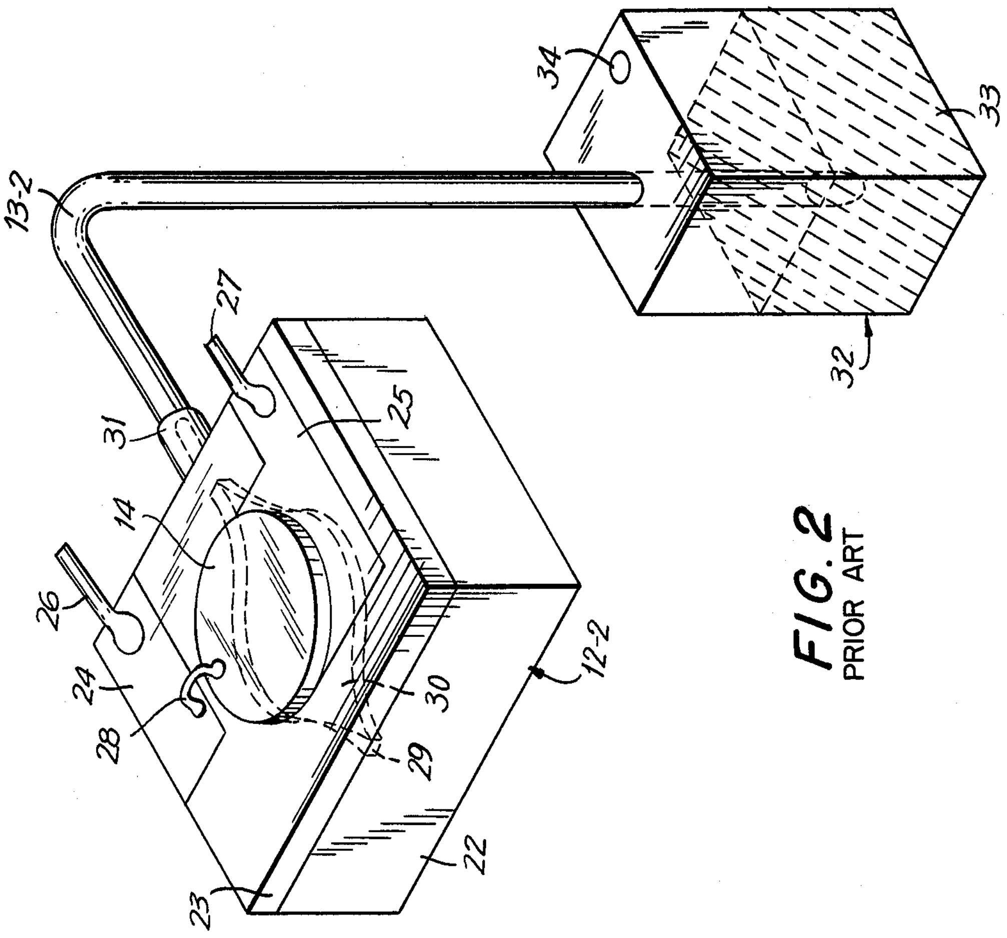
FIG. 2 PRIOR ART
FIG. 2 is a perspective view of the print nozzle and conventional ink tank of the type utilized in the ink jet printer illustrated in FIG. 1.

Turning now to FIG. 2, the construction of an ink jet head 12-2 and an ink jet tank 32 for printing with a device of the type illustrated in FIG. 1 is shown. Ink jet head 12-2 includes a body portion 22 and an upper vibration plate 23 mounted thereon. A pressure chamber 30 having a nozzle 29 are formed within head 12-2. Piezoelectric element 14 is mounted on pressure chamber 30 and connected to the print control circuit through a first lower electrode 25. A second upper electrode 24 mounted on vibration plate 23 is connected to the opposed surface of piezoelectric element 14 by a bonding wire 28. Electrodes 25 and 24 are respectively connected with the print control circuit (not shown) through input lines 27 and 26. When a voltage is applied to input lines 27 and 26 at the same time that a print signal from the print control circuit is detected, an ink 33 is discharged through an orifice at nozzle 29. Ink 33 is stored in an ink tank 32 and is supplied to head 12-2 through an ink supply pipe 13-2 at an ink supply port 31.

In a device constructed as illustrated in FIG. 2, ink tank 32 is always placed in a position lower than head 12-2. This prevents ink 33 from flowing out nozzle 29. The surface tension of ink 33 in nozzle 29 is well-balanced with the pressure which would cause back flowing into ink tank 32 or escaping out nozzle 29. As ink 33 is removed from ink tank 32, air enters ink tank 32 through an air intake opening 34. This regulates internal pressure in ink tank 32 to atmospheric. In this type of system, printing is consistent when ink tank is in the appropriate elevevation with respect to pressure chamber 30. However, when ink tank 32 is lifted to a higher position than head 12-2, normal printing is not possible as ink flows out through the orifice in nozzle 29. Alternatively, ink 33 escapes at nozzle 29 during suspension of printing. Escaping ink soils the region about the printing device. Accordingly, devices constructed in this manner must be moved with due care, and such an ink jet printer constructed in this manner is not suitable for use in an apparatus which is frequently moved.

Turning now to FIG. 3, a schematic illustration of another conventional arrangement for an ink jet printing device is shown. In this construction, pressure chamber 30 is formed in body 22 when vibration plate 23 and piezoelectric element 14 are joined thereto. These elements constitute the printing head and ink is supplied thereto through ink supply port 31. In this system, ink is stored in an ink tank 37 which includes pressure means 38 for forcing ink towards the print head. The amount of ink which is supplied to the print head is controlled by a valve 36 disposed between ink tank 37 and an absorption pump 35 which includes a plunger 39 normally set in a first position 41 indicated by a solid line for maintaining balance on a fulcrum 40. When printing is suspended, valve 36 is placed in a closed position and plunger 39 is displaced to a second position indicated by a broken line 42. At this time, absorption pump 35 expands as indicated by a broken line 43 for maintaining a negative pressure inside absorption pump 35 and the ink in nozzle 29 and pressure chamber 30 is returned to absorption pump 35.

A printing device constructed in accordance with the system depicted in FIG. 3 possess some advantages. Such a system permits an apparatus including such an ink jet printer to be freely carried about. However, several disadvantages are present. These include, an apparatus of enlarged size, high manufacturing cost, and so on. Significantly, there also remains some problems of intrusion of bubbles into the ink when the ink is returned from pressure chamber 30 to absorption pump 35. Additionally, since the structure of an ink jet printer including such a system is complicated, there are recurrent problems with respect to reliability of the device. Accordingly, an ink jet printer device including an ink jet tank constructed in accordance with the invention is intended to eliminate the above-mentioned disadvantages. Devices constructed in accordance with the invention will now be described.

Referring now to FIGS. 4 and 5, a printing device constructed and arranged in accordance with a first embodiment of the invention is shown. This embodiment depicts an ink on-demand type ink jet head which includes vibration plate 23, piezoelectric element 14 for forming pressure chamber 30 and nozzle 29 with body 22 in the same manner as described above. Ink stored in an ink tank 45 is supplied to the print head through ink supply port 31 by an ink passage 44.

Ink tank 45 is an ink bag formed of an organic material, such as polypropylene which isolates the ink from the external atmosphere. When the ink bag is filled with ink or before ink is supplied to the print head, the volume of the bag in a stable state is larger as indicated by a broken line 47 so that the pressure within the bag is balanced against external atmospheric pressure. In normal circumstances, the ink bag is securely positioned for cooperating with the print head. However, when ink tank 45 is lifted to a position higher than the print head, ink 48 in nozzle 29 begins to flow out of nozzle 29 due to the pressure created by the difference in height as shown in FIG. 5*a*. Ink being ejected by nozzle 29 is indicated by numeral 49.

Ink tank 45 is elastic and operates as if a spring or biasing member 46 is inside the tank. In view of the elasticity, ink tank 45 takes on a shape in response to the amount of ink retained therein. After ink 49 flows out from nozzle 29 to some extent, the pressure produced by the difference in height between the print head and ink head 45 is equalized with the surface tension 50 of ink 48 within nozzle 29. This balance includes the spring pressure within ink tank 45 due to the elasticity thereof and the surface tension of the ink in nozzle 29 which prevents ink from flowing out as shown in FIG. 5*b*. Even if ink tank 45 is placed in a position lower than the print head, air is prevented from entering nozzle 29. This is due to the fact that there is a negative internal pressure within ink tank 45 which is caused by the surface tension 51 of the ink in nozzle 29 as illustrated in FIG. 5*c*. In a embodiment in accordance with the invention, the range of the negative pressure is from about −5 cm to −20 cm $H_2O$.

Figure 6:
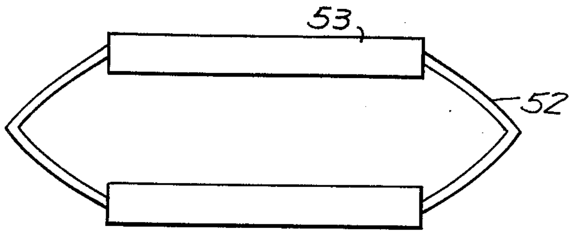
FIG. 6 is a cross-section of an ink tank constructed and arranged in accordance with an embodiment of the invention.
Figure 7:
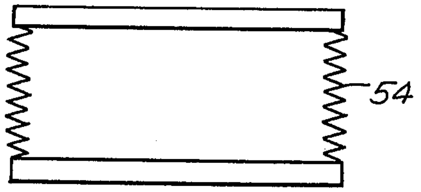
FIG. 7 is a cross-section of an ink tank constructed and arranged in accordance with another embodiment of the invention.
Figure 8:
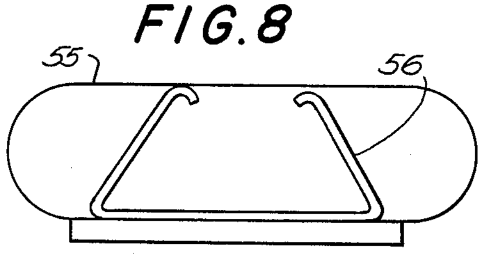
FIG. 8 is a cross-section of an ink tank constructed and arranged in accordance with yet another embodiment of the invention.

In FIGS. 6, 7 and 8, sectional views of ink tanks which produce negative internal pressures are shown. In FIG. 6, the ink tank includes opposed side walls 52 in a different thickness than opposed upper and lower walls 53 with the internal pressure regulated by the elasticity of side walls 52. In such a construction, the ink tank is characterized in that the ink may be fully removed from the tank. Generally, if the thickness of the walls is uniform, the elasticity varies with consumption of the ink and the ink is removed from the regions where elasticity is weak. In the ink tank constructed as illustrated in FIG. 6, provided that the thickness of the walls are uniform, ink is removed from the central portion of the ink tank. It is difficult to remove ink in the peripheral elastic region where the initial elasticity is high. In contrast, if the whole tank is of weak elasticity, the volume of ink stored in the tank in the initial stage is small where the negative pressure of the ink is balanced with the surface tension of the ink. In order to eliminate these defects, side walls 52 in accordance with the embodiment of FIG. 6 are thinner than lower walls 53 in the central region and the flat ink tank is uniformly deformed due to the elasticity of side walls 52 thereby permitting ink to be fully removed from the tank. In accordance with this embodiment of the invention, when the outside diameter of the ink tank is 40 mm and the thickness thereof is 5 mm, thickness of the side walls is betweeen about 0.1 to about 0.5 mm when the ink tank is formed of a polypropylene material. An ink tank of such dimensions provides the desired performance. The embodiment illustrated in FIG. 7, the ink tank includes bellows-type side walls 54 and the internal pressure is well balanced by the elasticity of the bellows. In FIG. 8, an ink tank 55 is provided with walls of uniform thickness, however, it is provided with a spring bias member 36 therein for regulating collapse thereof.

Figure 9:
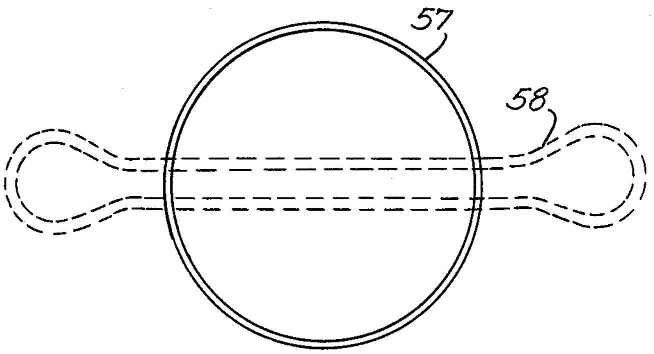
FIG. 9 is an illustration of an ink tank constructed and arranged in accordance with yet a further embodiment of the invention.
Figure 10:
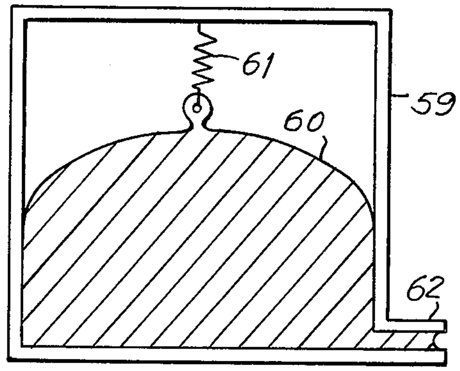
FIG. 10 is a schematic illustration of an ink bag constructed and arranged in accordance with another embodiment of the invention.

FIG. 9 illustrates a tank similar to those illustrated in FIGS. 6–8 which also produces negative internal pressure. In the construction shown in FIG. 9, a cylindrical ink tank 57 is shown which is deformed to a flat shape shown as 58 after consumption of the ink. When the ink is consumed, the internal pressure is made negative due to the elasticity applied in the direction of the circumference of the tank. In a further embodiment illustrated in FIG. 10, an ink bag 60 is disposed in an ink tank 59 and ink bag is mounted on ink tank 59 by an elastic member 61. Negative pressure is produced at an ink tank outlet 62 due to the pulling force of elastic members 61 on the walls of ink bag 60.

Figure 11:
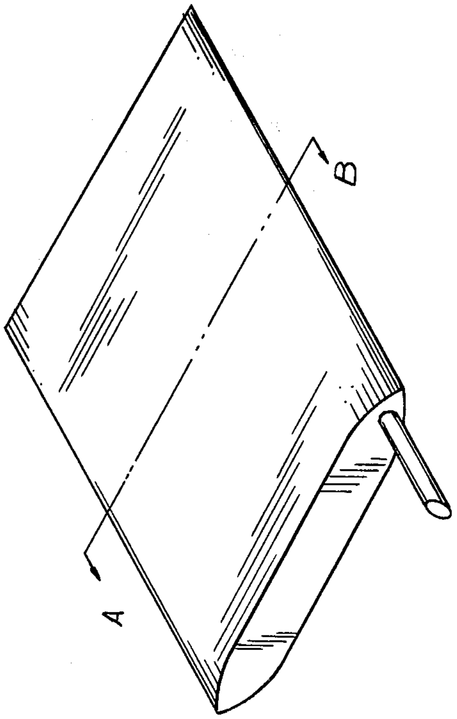
FIG. 11 is a perspective view of a flat ink tank in accordance with the invention filled with ink.
Figure 12:
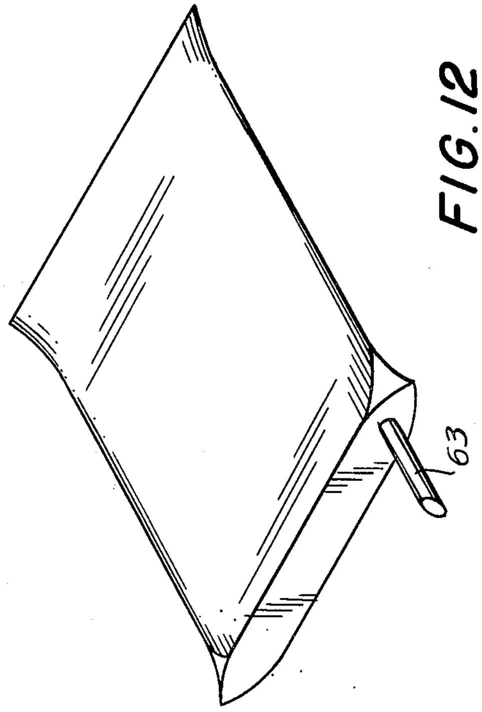
FIG. 12 is a perspective view of the ink tank of FIG. 11 after ink has been exhausted.

Referring now to FIG. 11, the appearance of a flat ink tank is illustrated. In FIG. 11, the flat ink tank is shown filled with ink. In FIG. 12, the flat ink tank is illustrated after the ink has been withdrawn. Dotted line A-B indicates the position where the sectional view shown in each of FIGS. 6–8 was taken. Flat ink tanks constructed in accordance with this enbodiment of the invention are formed of an organic material into a unitary construction by blow molding, or the like. The tanks are formed with an outlet 63. Outlet 63 may be unitarily molded with the ink tank. Alternatively, ink outlet 63 may be formed separately and mounted on an ink tank by an appropriate adhesive.

Figure 13B:
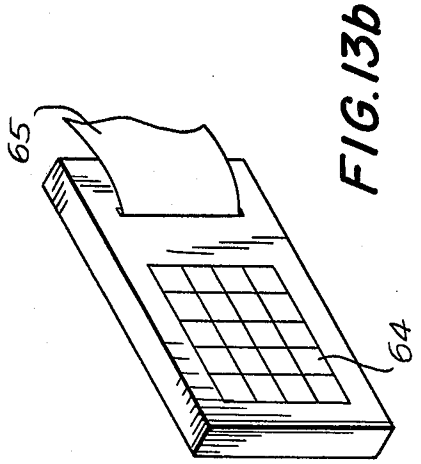
FIG. 13*a*, FIG. 13*b* and FIG. 13*c* illustrate various printing orientations for a printer constructed in accordance with the invention.
Figure 13A:
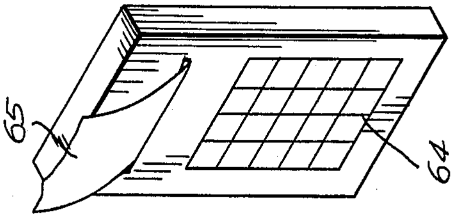
Figure 13C:
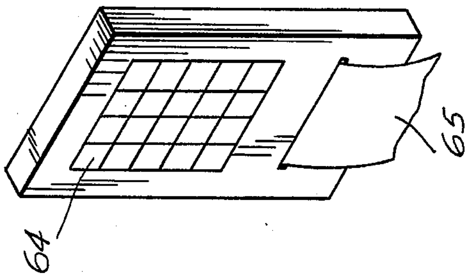

FIGS. 13*a–c* illustrate how a printing apparatus including an ink tank constructed and arranged in accordance with the invention having negative pressure may be used. The apparatus including an ink jet printer constructed in accordance with the invention may include a keyboard 64 and prints on a print paper 65. The printing apparatus may be laid on a lateral side as opposed to the normal position as illustrated in FIG. 13*a*. When in this orientation, the printing apparatus performs normally without ink escaping since the ink tank is in a position lower than the nozzle. However, if the apparatus included an ink tank constructed in accordance with the illustration in FIG. 2, the ink would flow out air intake 34 when the printing apparatus is positioned on the lateral side as illustrated in FIG. 13*a*. When the ink tank is of a flat constructed as illustrated in FIGS. 11–12, ink outlet 32 is joined directly to ink supply 32 of FIG. 2. Since the ink tank itself produces a negative pressure when ink is withdrawn due to the elasticity of the side walls, there is no necessity for providing the ink tank with a hole opening to the atmosphere. Thus, there is no route for ink to escape.

FIGS. 13*b* and 13*c* respectively illustrate two situations where the printing apparatus is positioned on a longitudinal side (FIG. 13*b*) and where the apparatus is turned upside down (FIG. 13*c*). In the conventional construction of FIG. 2, if the ink tank is in a position above the nozzle, the pressure produced thereon due to the difference in height is applied to the ink in the nozzle portion and ink escapes. However, ink does not escape from a nozzle in the device including an ink tank constructed in accordance with the invention if the negative pressure in the ink tank is greater than the pressure produced due to the difference in height between the ink tank and the nozzle. Accordingly, normal printing may be performed.

In a printing device including an ink tank constructed and arranged in accordance with this embodiment of the invention, the ink tank itself produces the negative pressure which makes normal printing possible even if the printing apparatus is disposed in a variety of orientations. Accordingly, a user is not inconvenienced by ink leakage or seepage when the printing apparatus is moved as occurs with conventional ink jet type printers. Additionally, the structure is simplified thereby reducing manufacturing costs and improving the reliability of the printer. Furthermore, the overall desirability of such an ink jet printing device is improved. It is also possible to produce a light weight and compact apparatus having low power requirements which permits use of a battery as an energy source for driving the ink jet printer. The net result is an ideal portable or pocketable apparatus including an ink jet printer.

Construction of the ink tank of an organic material is of great importance for reducing cost of manufacture. In addition to providing an ink tank having flat side walls, it permits fabrication of side walls of different thicknesses which permit the complete removal of the ink stored therein. Such an ink tank has additional advantages due to this increase in efficiency. Additionally, the one-piece formulation of an organic material permits further simplification by forming the ink supply port into the one-piece construction. Even if the ink supply portion is formed separately, the adjoining region for the ink supply port can be formed at the time the one-piece ink tank is formed. Furthermore, it is possible to mount the ink tank at the same time as formed thereby further reducing cost of manufacture.

In addition to substantially reducing the cost of manufacture and operating the printer, this permits use of an exchangable ink cartridge without spilling ink. The use of an ink cartridge prevents dust from entering the ink tank thereby improving the reliability of the printing device. Air bubbles are prevented from entering the ink jet head when the internal pressure is made positive by pressing on the negative pressure ink tank thereby expelling the bubbles through the nozzle. Such a system provides a simplified structure for preventing air from intruding into the ink source.

The description of this embodiment of the invention has included descriptions of ink tanks which themselves produce negative pressure. It is intended not to be limited to the specific shapes or materials illustrated. Furthermore, the ink tanks and cartridges in accordance with this embodiment of the invention are applicable to a variety of apparatus which utilize fluids to be discharged through a nozzle connected thereto.

Referring now to FIG. 14, an ink tank 135 which produces negative internal pressure in accordance with the invention is shown. Ink tank 135 is filled with an ink 136 which is fed to an ink supply port 138 in the print head. In this embodiment, the print head is positioned lower than ink tank 135 and ink 136 flows out from ink nozzle as indicated by reference numeral 137. However, if ink tank 135 is elastic as if springs were biasing means 139 exist within the tank, ink tank 135 will produce a negative pressure itself. Accordingly, a certain degree of the negative pressure will balance with the surface tension represented by numeral 140 of ink 136 at the orifice of nozzle 138 as shown in FIG. 15*a*. When the negative pressure is increased, ink 136 withdraws into orifice 138 so that surface tension represented by numeral 141 is within nozzle 138 as illustrated in FIG. 15*b*.

When the negative pressure generated by elastic ink tank 135 becomes greater than the surface tension of ink 136, air bubble 143 may intrude into ink 136 through the orifice of nozzle 138. Bubble 143 breaks the surface tension at 142 which is in the interior region of nozzle 138 and bubble 143 may then flow into ink tank 135 as shown in FIG. 15*c*. This phenomenon is substantially the same as occurs when a bubble intrudes into pressure chamber 30 from nozzle 29 of the ink jet head described in connection with FIGS. 1–5. As a result of intrustion of the air bubbles, when pressure is applied on pressure chamber 30 by piezoelectric element 14 in response to print command signals, the intruded bubble absorbs the applied pressure and ink will not be discharged as desired. Further embodiments of the invention for overcoming this disadvantage will be described in connection with the ink tanks and detection devices illustrated in FIGS. 16–27.

Referring now to FIGS. 16 and 17, an ink tank 144 for generating a negative pressure within formed of a conductive material is shown. The negative pressure tank in FIG. 16 is shown filled with ink. The ink tank is flat and is provided with an insulating member 145 which insulates an upper wall 144-1 and a lower wall 144-2 from each other. A pair of lead wires 146-1 and 146-2 are electrically connected with upper wall 144-1 and lower wall 144-2 for electrical connection to a detector 147. In an ink tank constructed in this manner, upper wall 144-1 and lower wall 144-2 come into contact with each other upon exhaustion of ink for electrically shorting the circuit as shown in FIG. 17. When this electrical short occurs, a hand 148 or indicator means in detector 147 is deflected indicating that the ink supply is exhausted.

In this type of construction, the contact resistence of the conductive material is low so that a short will be detected even if an extremely low voltage is applied between the upper wall 144-1 and lower wall 144-2. Electrical influences such as electrolysis of the ink or the like do not become a serious problem upon application of intermitent pulses or AC pulse. In order to construct an ink tank in accordance with this embodiment of the invention, the conductive upper and lower walls may be formed of a conductive rubber or organic material, such as, a conductive plastic material, metal foil or the like. Alternatively, conductive regions may be applied on selected portions of the surfaces of the upper and lower walls. Moreover, an ink tank constructed and arranged in accordance with this embodiment of the invention operates more accurately if the ink tank is provided with a convex region for regulating the negative pressure.

Figure 18:
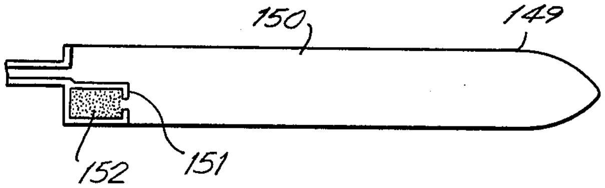
FIG. 18 is a view of a detecting device including a secondary ink chamber within the ink tank.
Figure 19:
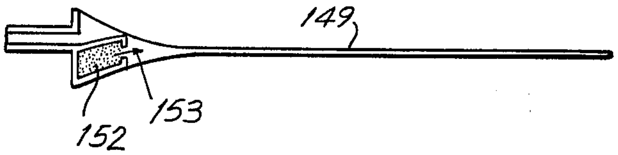
FIG. 19 is a view of the tank of FIG. 18 after the ink has been exhausted.

Turning now to FIGS. 18 and 19, a further negative pressure tank 149 for printing filled with a printing ink 150 and including a second indicator ink tank 151 therein is shown. Second indicator ink tank 151 includes a second color printing ink 152 which is a different color than printing ink 150. The pressure of the ink in indicator ink tank 151 is balanced against the pressure of ink 150 surrounding second tank 151 due to the external pressure which is applied on second tank 151 by ink 150 with a negative pressure tank 149. Second indicator ink 152 may be red for indicating exhausting of printing ink 150. Although inks of different colors often mix even at rest, inks different properties tend to repulse each other. For example, a water-soluble ink in an oil-base ink will repulse each other and will not mix when at rest.

In addition to these different ink properties, the bouyancy can also assist an ink selection. For example, by utilizing ink of similar specific gravities and selecting a position wherein the second ink tank is positioned will prevent ink from mixing. Since the negative pressure of ink tank 149 acts on the nozzle of the print head the pressure difference between ink 150 and second ink tank 151 is the same. Therefore, second indicator ink 152 will not flow out. However, when upper and lower walls of ink tank 149 come into contact upon exhaustion of the supply of printing ink 150 as illustrated in FIG. 19, external pressure is applied to second indicator ink tank 151 and second indicator ink 152 within tank 151 is pressed out into the main chamber of ink tank 149 as indicated by an arrow 153. As a result of this, second ink 152 is discharged from the nozzle of the print head and printing in a second color occurs. This warns the user of the exhaustion of the main ink supply. The elasticity of second ink tank 151 is equal to or less than the negative pressure ink tank 149 at the contact region between second tank 151 and negative pressure tank 150. Second ink tank 151 is formed by using a region of the walls of ink tank 149. It is also possible to include a plurality of secondary ink tanks within the main tank in order to discharge ink of a different color at selected times for indicating the amount of ink remaining in ink tank 149.

Figure 20:
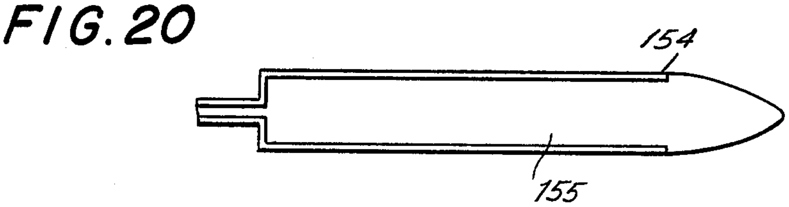
FIG. 20 is a view of a transparent tank and photosensitive detecting device.
Figure 21:
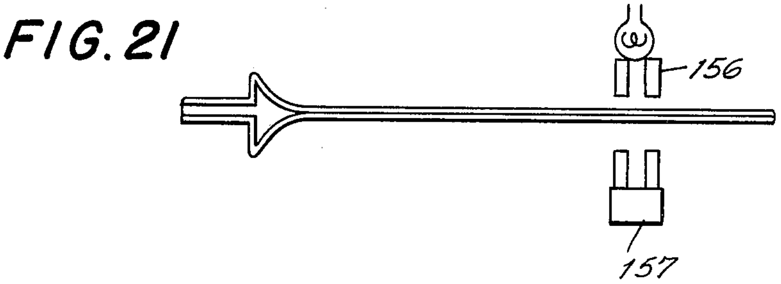
FIG. 21 is a view of the tank of FIG. 20 after the ink is exhausted.

FIGS. 20 and 21 illstrate a further embodiment wherein a transparent ink tank 154 wherein the walls are formed of a transparent material. As shown in FIG. 20, ink tank 154 is filled with an ink 155 so that light will not pass through the tank due to the opaque nature of ink 155. However, upon exhaustion of the supply of ink 155 as illustrated in FIG. 21, light will penetrate therethrough. The regions of ink tank 154 which permit light to penetrate may be detected by a photosensitive means including a light emission member 156 and a photosensitive member 157.

Figure 22:
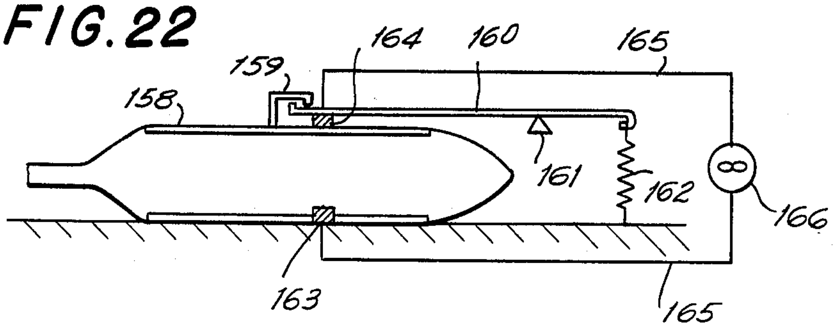
FIG. 22 is a view of a filled ink tank including a detecting device having conductive members.
Figure 23:
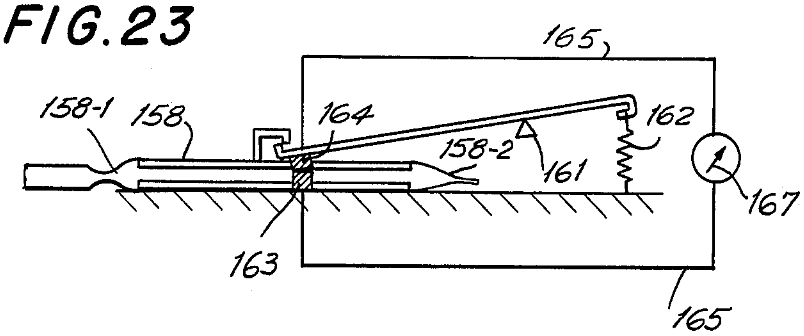
FIG. 23 is a view of the device of FIG. 22 after the ink is exhausted.

Referring now to FIGS. 22 and 23, a device for holding an ink tank of moderate elasticity is shown. Ink tank 158 includes elastic regions 158-1 and 158-2 for producing negative pressure within ink tank 158. Ink tank 158 as illustrated in FIG. 22 is shown filled with ink. At this time, a deflecting arm 160 is engaged with a hook mounted to the upper portion of ink tank 158. Deflection arm 160 is mounted on a fulcrum 161 and the free end is biased by a spring 162. Deflection arm 160 is also provided with an electrically conductive contacting region 164 which cooperates with a second electrically conductive contacting region 163 which is mounted on the opposed side of ink tank 158.

As ink is withdrawn from ink tank 158 the upper ridgid wall of ink tank 158 approaches the opposed ridgid wall 158-4 due to deflection by elastic regions 158-1 and 158-2. Upon exhaustion of ink, contacting portions 163 and 164 come into contact with each other due to deflection of deflection arm 160 about fulcrum 161. At this time an electrical circuit including lead wires 165 and indicator means 167 is completed. Exhaustion of ink is shown by an indicator dial 167 in detector 166. In this embodiment of the invention, exhaustion of ink supply in ink tank 158 is detected by means of mechanical contact. It is also within the invention to detect exhaustion of ink by employing magnetism, light and measuring capacity of the remaining ink. By providing a device constructed in this manner, costs are reduced by combining the negative pressure tank and detection of exhaustion of ink at the same time. From a functional view point, this results in an added advantage due to the negative pressure. While the device has been described wherein the negative pressure assists in detection in a device separate from the tank, the detecting device may be formed into a unitary body with the ink tank.

Referring now to FIGS. 24–27, a device wherein an ink tank 168 is housed in a frame box 169 is shown. Frame box 169 is shown with a cover 169-1 in an open position in FIG. 24. Frame box 169 includes a pair of fixed contacting portions 72 on opposite sides of ink tank 168. Contacting portion 72 are positioned for cooperating with a detecting bar 170 mounted n cover 169-1 by a holding frame 170. Detecting bar 171 is moveably supported on cover 169-1 so as to move freely when cover 169-1 is closed during operation of a printing device. Detecting bar 170 may be displaced between a first position out of contact with stationary contacting portion 172 when ink tank 168 is filled and a second position when ink tank 168 is emptied so as to contact stationary contacting regions 172. Detecting bar 171 and contacting portions 172 are electrically connected with a detector 174 through lead wires 173.

Figure 24:
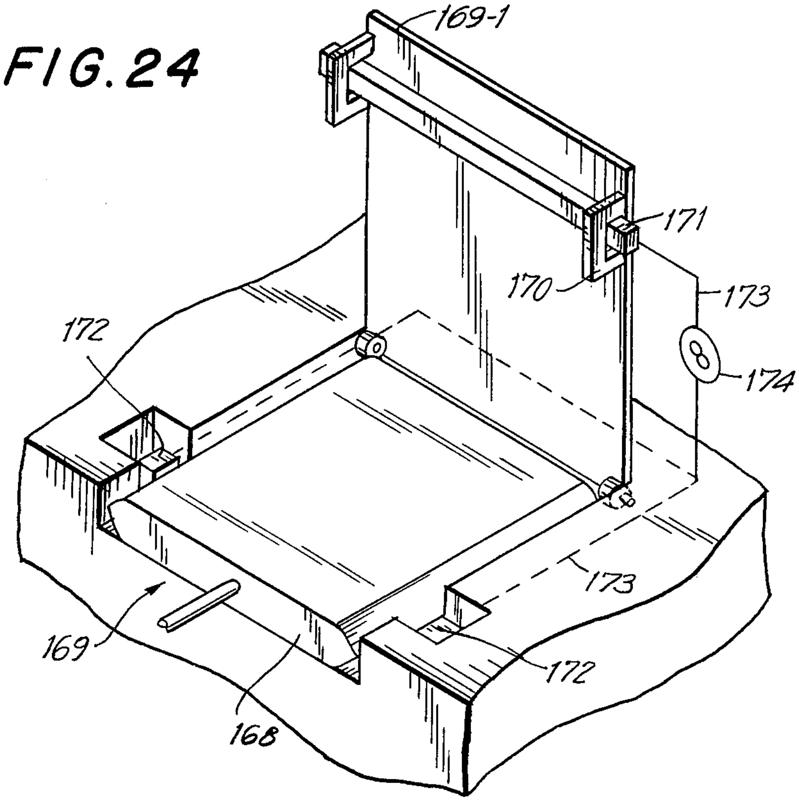
FIG. 24 is a perspective view of an ink tank and detection device with the cover in an open position.

FIG. 25 is a sectional view through ink tank 168 and frame box 169 of FIG. 24. Cover 169-1 is shown in an open position. In FIG. 26, cover 169-1 is shown in a closed position with detecting bar 171 spaced apart from cooperating contact portion 172. This is the position of contacting bar 171 and contacting portion 172 when ink tank 168 is filled with ink. As detecting bar 171 and contacting portions 172 are not in contact due to the thickness of ink tank 168, the electrical circuit including detector 174 remains open.

Ink tank 168 is a negative pressure tank and detecting bar 171 will come into contact with contacting portion 172 only upon removal of obstruction of tank 168. Ink tank 168 is a negative pressure tank and collapses upon withdrawal of ink therefrom. as indicated by numeral 176 in FIG. 27. Upon exhaustion of ink therefrom, detecting bar 171 comes into contact with contacting portions 172 and a hand of detector 174 is deflected indicating that the ink is exhausted from ink tank 168. In this embodiment of the invention detecting bar 171 presses against ink tank 168 with its own weight. It may also be possible to have detecting bar 171 apply less external force than the elasticity of ink tank 168. This will not force the ink to be expelled from ink tank 168.

Accordingly, by constructing and arranging a printing device including a negative pressure ink tank in accordance with the invention results in many advantages. The intrusion of air bubbles due an increase in negative pressure can be prevented. Moreover, an ink jet printer including a cartridge type ink tank may be constructed. This permits changing the cartridge upon indication of exhaustion of ink thereby preventing attempts at printing after the ink supply is consumed. Additionally, there is a substantial simplification of the mechanism necessary to detect the quantity of remaining ink in the ink jet printer.

Use of the elastic negative pressure ink tank not only creates the negative pressure, but also is used to detect the quantity of remaining ink. This multi-functional use of components of the printing device results in reduction in manufacturing costs. Additionally, since the quanity of remaining ink is detected by deflection of the elastic walls of the ink tank, a detection device may be mounted either inside or outside the ink tank. Furthermore, it is also possible to detect the quantity of remaining ink by changing the color during printing. This permits clear indication of the exhaustion of ink supply. As it is possible in this embodiment to provide more than one additional ink chamber, it is possible to provide a precautionary signal in addition to the warning of exhaustion of ink supply. Furthermore, devices constructed and arranged in accordance with the invention exhibit many of the advantages which can be applied to other types of ink tanks in other devices which include negative pressure tanks.

It will thus be seen that the objects set forth above, among those made apparent from the preceding description, are efficiently attained and, since certain changes may be made in carrying out the above methos and in the construction set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A negative pressure tank for storing and selectively dispensing a printing fluid for use in an ink jet printer including a nozzle coupled to the tank, the printing fluid being selectively discharged through the nozzle connected to the tank, comprising a vessel for storing said fluid, the walls of said vessel formed of an organic material and including biasing means for generating and maintaining a negative pressure with respect to atmospheric pressure in said vessel said vessel and biasing means being adapted so that the negative pressure is less than the surface tension of fluid within the nozzle and further within a range so that fluid does not escape from the nozzle when the vessel is disposed at a height above or below the nozzle.

2. The negative pressure tank of claim 1 including an outlet molded in a single piece with the remainder of said vessel.

3. The negative pressure tank of claim 1, wherein the negative pressure is in the range between bout $-5$ to $-20$ cm $H_20$.

4. The negative pressure tank of claim 1, wherein said biasing member is disposed in said vessel.

5. The negative pressure tank of claim 1, wherein said biasing member is disposed outside of said vessel, negative pressure being generated in said vessel by biasing the outside wall of said vessel with said biasing member.

6. A negative pressure tank for storing and selectively dispensing a printing fluid for use in a ink jet printer including a nozzle coupled to the tank, the printing fluid being selectively discharged through the nozzle connected to the tank, comprising a vessel for storing said fluid, formed of an organic material, said vessel being substantially flat and including a pair of opposed substantially planar walls and an elastic side wall between said planar walls with the internal negative pressure regulated by the elasticity of said side walls, said vessel being adapted so that the negative pressure is less than the surface tension of fluid within the nozzle and further within a range so that fluid does not escape from the nozzle when the vessel is disposed at a height above or below the nozzle.

7. The negative pressure tank of claim 6, wherein said side walls are bellows-shaped.

8. The negative pressure tank of claim 6, wherein said side walls are thinner than said planar walls.

9. The negative pressure tank of claim 6, including an outlet molded in a single piece with the remainder of said vessel.

10. The negative pressure tank of claim 6, wherein the negative pressure is in the range between about $-5$ to $-20$ cm $H_2O$.

11. A device for detecting the quantity of a fluid remaining in a negative pressure tank for storing and selectively discharging the fluid through a nozzle connected to the tank, comprising an elastic vessel having a pair of opposed substantially planar walls for storing said fluid and generating a negative pressure when said fluid is discharged therefrom, and means for detecting the quanity of remaining fluid in said vessel including conductive members affixed to said walls and adapted to contact for closing an electrical circuit in response to said opposed walls being displaced towards each other upon withdrawal of fluid from said vessel.

12. The device of claim 11, wherein at least a portion of said opposed walls of said vessel are conductive and the opposed walls are separated by an insulating member whereby said conductive portions close an electrical circuit upon withdrawal of fluid from said vessel.

13. A device for detecting the quantity of a fluid remaining in a negative pressure tank for storing and selectively discharging the fluid through a nozzle connected to the tank, comprising an elastic vessel having a pair of opposed substantially planar walls for storing said fluid and generating a negative pressure when said fluid is discharged therefrom, means for detecting the quantity of remaining fluid in said vessel, and further including a secondary fluid chamber in said vessel for holding a fluid of a different color than the fluid in said vessel for warning of the exhaustion of fluid from said vessel.

14. The device of claim 13, further including a plurality of secondary fluid chambers within said vessel for providing various precautionary warnings in response to exhaustion of fluid from said vessel.

15. A device for detecting the quantity of a fluid remaining in a negative pressure tank for storing and selectively discharging the fluid through a nozzle connected to the tank, comprising an elastic vessel having a pair of opposed substantially planar walls for storing said fluid and generating a negative pressure when said fluid is discharged therefrom, means for detecting the quantity of remaining fluid in said vessel, said detection means including a conductive member mounted on the upper surface of said vessel and an opposed cooperating conductive region, said conductive member and conductive region spaced apart when said vessel is filled with fluid, said conductive member being displaced towards said conductive region upon withdrawal of fluid from the vessel so that said conductive member contacts said conductive portion upon exhaustion of fluid from said vessel for closing an electrical circuit for indicating exhaustion of fluid from said vessel.

16. The device of claim 15, wherein said conductive member excerts less pressing force on said vessel than the opposing force of said negative pressure within said vessel.

17. An ink jet printer for printing characters and symbols on a print medium by selectively discharging ink from a print nozzle towards said medium, comprising:

an ink jet head including a pressure chamber for selectively discharging ink from said nozzle; and an elastic ink tank formed of an elastic organic material including two opposed substantially planar walls and a side wall between said planar walls and thinner than said planar walls connected to said pressure chamber for supplying ink to said print head, said ink tank generating a negative pressure against atmospheric pressure within said ink tank upon withdrawal of ink therefrom by the elasticity of said side wall said vessel being adapted so that the negative pressure is less than the surface tension of fluid within the nozzle and further within a range so that fluid does not escape from the nozzle when the vessel is disposed at a height above or below the nozzle.

18. The ink jet printer of claim 17, wherein said organic material is polypropylene.

19. The ink jet printer of claim 17, further including detection means for detecting the quantity of ink remaining in said tank in response to displacement of the walls of said vessel upon substantial completion of withdrawal of ink therefrom.

20. The ink jet printer of claim 19, wherein said detection means includes conductive members for completing an electrical circuit upon substantial completion of withdrawal of ink from said ink tank.

21. An ink jet printer for printing characters and symbols on a print medium by selectively discharging ink from a print nozzle towards said medium, comprising:

an ink jet head including a pressure chamber for selectively discharging ink from said nozzle;

an elastic ink tank connected to said pressure chamber for supplying ink to said print head;

a detection means for detecting the quantity of ink remaining in said ink tank; and at least two opposed cooperating regions of the walls of said ink tank, said at least two cooperating regions of the walls of said ink tank being formed of a conductive material and separated by an insulating region for closing an electrical circuit upon exhaustion of ink from said tank and deflection of said walls towards each other.

22. An ink jet printer for printing characters and symbols on a print medium by selectively discharging ink from a print nozzle towards said medium, comprising:

an ink jet head including a pressure chamber for selectively discharging ink from said nozzle;

an elastic ink tank connected to said pressure chamber for supplying ink to said print head and generating a negative pressure against atmospheric pressure within said ink tank upon withdrawal of ink therefrom;

a detection means for detecting the quantity of ink remaining in said ink tank, said detection means including a secondary ink chamber within said ink tank, said secondary ink chamber including ink of a color other than that used for normal printing for warning a user of the exhaustion of ink in said ink tank.

23. The ink jet printer of claim 22, wherein said ink in said secondary ink chamber has different ink properties than the ink in said ink tank.

24. An ink jet printer for printing characters and symbols on a print medium by selectively discharging ink from a print nozzle towards said medium, comprising:

an ink jet head including a pressure chamber for selectively discharging ink from said nozzle;

an elastic ink tank connected to said pressure chamber for supplying ink to said print head and generating a negative pressure against atmospheric pressure within said ink tank upon withdrawal of ink therefrom;

means for detecting the quantity of ink remaining in said ink tank in response to displacement of the walls of said vessel upon withdrawal of ink therefrom; and means for producing a negative pressure within said ink tank provided separately from said ink tank and wherein said detecting means is included as a part of said means for producing the negative pressure.

25. An ink jet printer for printing characters and symbols on a print medium by selectively discharging ink from a print nozzle towards said medium, comprising:

an ink jet head including a pressure chamber for selectively discharging ink from said nozzle;

an elastic ink tank connected to said pressure chamber for supplying ink to said print head and generating a negative pressure against atmospheric pressure within said ink tank upon withdrawal of ink therefrom;

means for detecting the quantity of ink remaining in said ink tank in response to displacement of the walls of said vessel upon withdrawal of ink therefrom;

a housing for mounting said negative pressure ink tank, and said housing including means in contact with said ink tank for applying less pressure than the negative pressure within said ink tank and means in contact with said tank for forming an element of said detecting means.

26. The ink jet printer of claim 25, wherein said housing includes a conductive region for cooperating with said means in contact with said tank and, whereby upon withdrawal of ink from said ink tank said conductive member is displaced towards said conductive region and upon exhaustion of ink in said ink tank contacts said conductive region for closing an electrical circuit for generating a signal.

* * * * *